(12) United States Patent
Hamerski

(10) Patent No.: US 7,089,641 B2
(45) Date of Patent: Aug. 15, 2006

(54) ADHESIVELY MOUNTED CLAMP DEVICE

(75) Inventor: Michael D. Hamerski, Baldwin, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 3 days.

(21) Appl. No.: 10/703,750

(22) Filed: Nov. 7, 2003

(65) Prior Publication Data

US 2005/0097718 A1    May 12, 2005

(51) Int. Cl.
*B23P 19/04*    (2006.01)

(52) U.S. Cl. .............................. 29/238; 29/255; 72/454

(58) Field of Classification Search .................. 29/238, 29/255, 256, 278, 281.1; 269/3, 6; 72/454
See application file for complete search history.

(56) References Cited

U.S. PATENT DOCUMENTS

| 4,024,312 | A |   | 5/1977  | Korpman |              |
|-----------|---|---|---------|---------|--------------|
| 4,116,035 | A | * | 9/1978  | Malarsky | ........... 72/389.6 |
| 4,440,374 | A |   | 4/1984  | Achille |              |
| 4,457,503 | A |   | 7/1984  | Connor  |              |
| 4,702,736 | A |   | 10/1987 | Kalt et al. |          |
| 4,942,071 | A | * | 7/1990  | Frye    | ............. 428/40.6 |
| 4,946,539 | A |   | 8/1990  | Ales et al. |          |
| 4,991,807 | A |   | 2/1991  | Radnich |              |
| 5,055,813 | A |   | 10/1991 | Johnson |              |
| 5,170,548 | A | * | 12/1992 | Ramirez | ............. 29/264 |
| 5,192,060 | A |   | 3/1993  | Novak   |              |
| 5,516,581 | A | * | 5/1996  | Kreckel et al. | ........ 428/317.3 |
| 5,820,116 | A | * | 10/1998 | Haese   | ............. 269/21 |
| 5,860,203 | A | * | 1/1999  | Gehr, Jr. | ........... 29/252 |
| 5,953,802 | A | * | 9/1999  | Radzio  | ............. 29/239 |
| 6,131,864 | A |   | 10/2000 | Schumann |           |
| 6,231,962 | B1| * | 5/2001  | Bries et al. | ....... 428/317.3 |
| 6,317,952 | B1|   | 11/2001 | Vogt    |              |
| 6,527,900 | B1| * | 3/2003  | Kreckel et al. | ...... 156/247 |
| 6,722,179 | B1| * | 4/2004  | Ventura | ............. 72/454 |
| 2005/0097718 | A1 | * | 5/2005 | Hamerski | ........ 29/238 |

FOREIGN PATENT DOCUMENTS

| DE | 33 31 016 C2 | 7/1992 |
| DE | 200 03 647 U1 | 6/2000 |
| DE | 101 49 246 C2 | 4/2003 |
| DE | 203 04 934 U1 | 7/2003 |
| FR | 2 821 637 | 9/2002 |
| GB | 2 369 802 A | 6/2002 |

OTHER PUBLICATIONS

"Ding King Twist-A-Dent Kit," The Ding King Tool, [retrieved from the internet on Jun. 27, 2003], URLhttp://www.dingking.tv/?source=ov, pp. 2.

* cited by examiner

*Primary Examiner*—Lee D. Wilson
(74) *Attorney, Agent, or Firm*—Trisha D. Adamson

(57) ABSTRACT

An adhesively mounted single-sided clamp-like device for producing a compressive force or tensile force includes a body, a plunger movably connected with the body, and a double-sided stretch releasing adhesive attached to at least one of the body and the plunger. The body and/or plunger can be firmly adhesively bonded to a surface or object and later cleanly removed from the surface or plunger without damaging the surface and without leaving adhesive residue by stretching the adhesive.

8 Claims, 2 Drawing Sheets

ADHESIVELY MOUNTED CLAMP DEVICE

FIELD OF THE INVENTION

The present invention relates generally to a device that can be used to apply either a compressive force or a tensile force to a surface or object, and more particularly, to such a device that is attached to a surface using stretch releasing adhesive, whereby the device can be firmly attached to the surface but may be easily and cleanly removed from the surface without damaging the surface.

BACKGROUND OF THE INVENTION

Suction attachable clamps are known in the prior art. U.S. Pat. No. 5,820,116 (Haese), for example, discloses a suction attachable retaining clamp for holding an object such as a molding or mounting bracket against a surface such as a windshield. U.S. Pat. No. 4,457,503 (Conner) discloses a suction clamp for holding moldings in place on front or rear windshields of automobiles, while an adhesive material sets or dries, and it simultaneously prevents damage to the adjacent surface. Such clamps, however, are limited to producing clamping or compressive forces, and work best on clean, slightly moistened, non-porous surfaces such as metal and glass.

There is therefore a need for a device that can function not only as a clamp but also as a device to exert a pulling or tensile force when needed. There is also a need for such a device that can be used for a variety of end use applications and can be used on a variety of surfaces under a variety of conditions.

It would therefore be desirable to provide a simple and inexpensive single-sided clamp-like device that can be securely fastened to a surface and readily removed without damaging the surface or leaving unwanted residue that can be used as both a clamp to exert a compressive force, and as a device to produce a pulling or tensile force. It would also be desirable to provide a device that can be used on a wide variety of surfaces including metal, glass, paper, masonry and unfinished wood, and is not limited to use on non-porous surfaces such as metal and glass.

SUMMARY OF THE INVENTION

The present invention overcomes the above-identified limitations in the field by providing a simple and inexpensive single-sided clamp-like device that can be applied to a surface and can be used not only as a clamp, but can also be used to produce a pulling or tensile force at a selected location on a surface or an object. The present invention also provides a device that can be used on a wide variety of surfaces including paper, wood, and masonry, and is not limited to use on non-porous surfaces such as metal and glass.

In one embodiment, the present invention provides a device for applying a tensile or compressive force to an object or surface comprising a body, a plunger movably connected with the body, and a double-sided stretch releasing adhesive attached to at least one of the body and the plunger, whereby the body and/or the plunger can be firmly adhesively bonded to a surface and cleanly removed from the surface without damaging the surface by stretching the adhesive.

In a specific aspect of the invention, the stretch releasing adhesive is attached to the body. In another aspect, the stretch releasing adhesive is attached to the plunger.

In one embodiment, the body includes a connecting portion containing a through bore, a pair of legs extending in the same direction from opposite sides of the connecting portion, and a pair of feet portions arranged perpendicular at the end of each leg. Each foot portion is provided with stretch releasing adhesive to attach the body to a surface.

In one aspect of the invention, the plunger is threadably connected with the body, whereby the plunger can be rotated clockwise and counter clockwise to produce the compressive and tensile forces. In another aspect, the plunger is slidably connected with the body and the plunger is biased by a spring or the like to produce the forces.

In another embodiment, the body includes a main body portion and a cantilever portion extending laterally outwardly from the main body portion, wherein the plunger is movably connected with the cantilever portion.

In another aspect, the plunger is provided with a head that is adapted to receive a stretch releasing adhesive. The plunger may also include a handle opposite the head to facilitate manual actuation of the plunger.

In a particular aspect, the invention may be used interchangeably to produce either a compressive (i.e. clamping) force or a tensile (i.e. pulling) force where in the past, two separate devices were needed to create compressive and tensile forces.

The present invention can be used for a wide variety of uses and applications such as holding an object in place while an adhesive, such as a hot melt adhesive, glue, or epoxy sets, dries, or otherwise cures. This may be useful, for example, to mount a soap dish to a ceramic tile wall using epoxy. In addition, the device may be used to removably mount one or more items on a surface such as decorations, a banner, or a flag, whereby the item may be readily and repeatably removed and/or replaced by simply loosening the device to remove the item without removing the device itself from the surface. The device may also be provided with a pointed tip or drill bit to mark, pierce, or form a hole in a surface or object. The present invention may find use in woodworking, crafts, or other uses in the home, office, or in industrial applications. For example, the present invention may be used to stamp or emboss a piece of paper or piece of wood.

BRIEF DESCRIPTION OF THE DRAWINGS

The present invention will be further described with reference to the accompanying drawings, in which.

DETAILED DESCRIPTION

Figure 1:
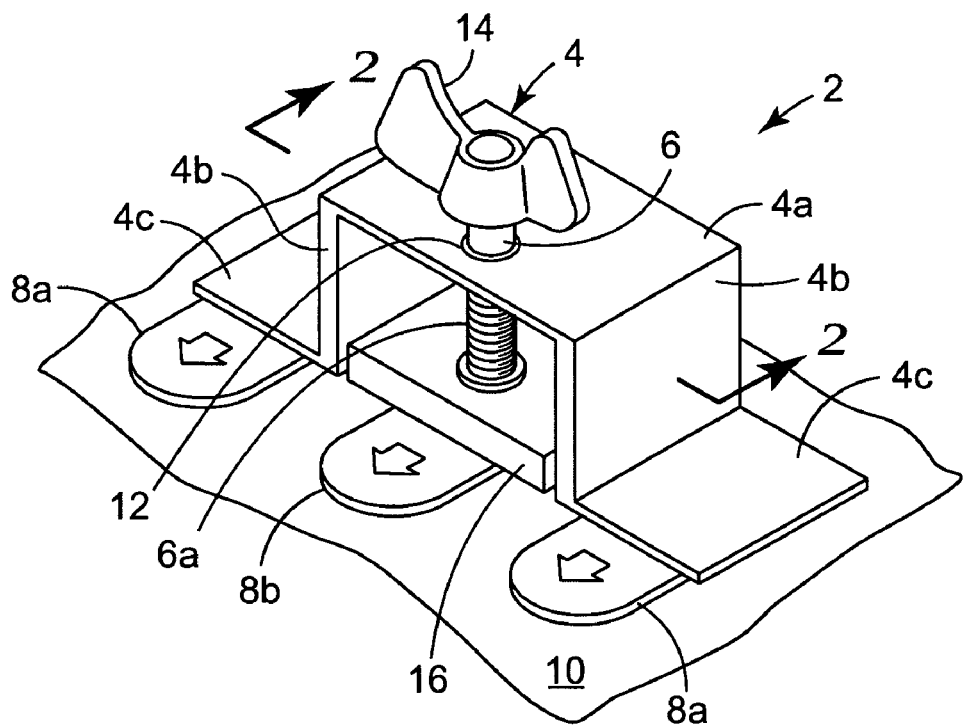
FIG. 1 is a perspective view of a device according to the invention.
Figure 2:
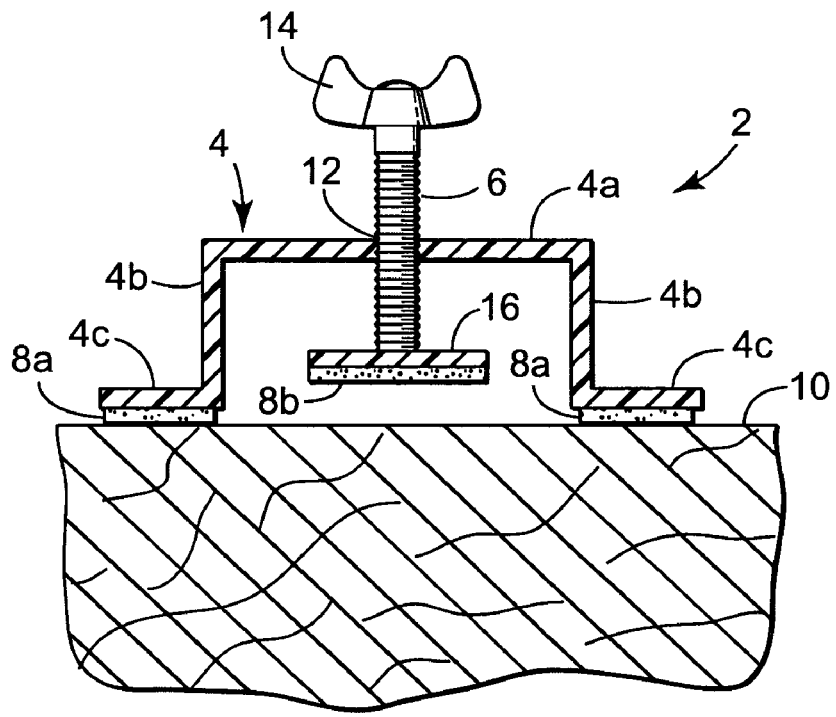
FIG. 2 is a sectional view taken along line 2—2 of FIG. 1.

Referring now to the drawings, FIGS. 1 and 2 show a device 2 including a body member 4, a plunger member 6 rotatably attached to the body member 4, a pair of double-sided stretch releasing adhesive strips 8*a* attached to the body member 4 to removably adhesively bond the body member 4 to a surface 10, and a double-sided stretch releasing adhesive strip 8*b* attached to the plunger member 6 for adhesively bonding the plunger member 6 to either the surface 10 or an object (not shown) arranged between the plunger member 6 and the surface 10.

Stretch releasing adhesives represent a class of high performance pressure-sensitive adhesives combining strong holding power with clean removal and no surface damage. Such stretch releasing adhesives are useful in a wide variety of assembling, joining, attaching, and mounting applications. The double-sided adhesive strips 8a,b may be any conventionally known stretch releasing adhesive tape including a stretch releasing adhesive tape with an elastic backing, a stretch releasing adhesive tape with a highly extensible and substantially inelastic backing, or a stretch releasing adhesive tape comprising a solid elastic pressure sensitive adhesive.

Specific tapes suitable for use in the various embodiments of the present invention include the pressure sensitive adhesive tapes with elastic backings described in U.S. Pat. No. 4,024,312 (Korpman), the pressure sensitive adhesive tapes with highly extensible and substantially inelastic backings described in U.S. Pat. No. 5,516,581 (Kreckel et al.) and Bries et al. (U.S. Pat. No. 6,231,962), and the solid elastic pressure sensitive adhesive described in German Patent No. 33 31 016.

A suitable double-sided commercially available stretch releasing adhesive is the product sold under the trade designation COMMAND adhesive by 3M Company, St. Paul, Minn. This product is currently manufactured as discrete strips with one end of the strip including a non-adhesive pull tab to facilitate stretching of the strip during removal.

In the illustrated embodiment, the body member 4 includes a bridge portion 4a containing a threaded opening 12 for receiving the plunger member 6, a pair of parallel leg portions 4b extending perpendicularly in the same direction from opposite sides of the bridge portion 4a, and a pair of feet portions 4c extending outwardly in opposite directions from the ends of the leg portions 4b. The adhesive strips 8a are affixed to the bottom surfaces of the feet portions 4c to adhesively bond the body member 4 to surface 10, and thereby securely bond the device 2 to the surface 10.

Plunger 6 is arranged generally perpendicular to the bridge portion 4a and includes a cylindrical threaded body portion 6a rotatably engaging the opening 12 in the body member 4, a handle 14 arranged at one end of the body portion 6a to facilitate manual rotation of the plunger 6, and a head 16 arranged at the end of the body portion 6a opposite the handle 14. The handle 14 is arranged above the bridge portion 4a of the body member 4 to allow a user to readily access the handle 14, and thereby manually rotate the plunger 6. The head 16 is arranged below the bridge portion 4a and is axially movable by rotational actuation of the plunger 6 via handle 14 either in the direction of the surface 10, thereby to apply a compressive force to the surface, or away from the surface 10, thereby to generate a tensile force relative to the surface. Head 16 is preferably connected with the plunger 6 with a slip fit type of connection to allow the body portion 6a and the head 16 to move independently. That is, when the body portion 6a of the plunger 6 is rotated, the head 16 may pivot to remain in contact with the surface but does not rotate.

To use the device 2 to apply a force to surface 10 or an object (not shown) arranged between the plunger 6 and the surface 10, the plunger 6 is rotated such that the head 16 moves in the direction of the surface 10. As the plunger 6 moves toward and engages the surface 10, a compressive force will be exerted on the surface 10 or on the object. It will be recognized that when the device is used in this manner (i.e. as a clamp to generate a compressive force), adhesive strips 8a are needed to maintain the device 2 in engagement with surface 10, but that adhesive strip 8b is not needed because the plunger 6 is maintained in contact with surface 10 via compression. Stated another way, when the device 2 is used as a clamp, the plunger 6 is forced against the surface 10 which, in turn, forces the body member 4 away from the surface 10, and the adhesive strips 8a serve to hold the body member 4 in contact with the surface 10 to allow the plunger 6 to exert a compressive force on the surface. To remove the device 2 from the surface 10, each adhesive strip 8a is stretched in the known manner to simultaneously debond the adhesive strip from the device and the associated surface.

Conversely, to use the device 2 to generate a pulling or stretching force on surface 10 or on an object (not shown) arranged between the surface 10 and the head 16, stretch releasing adhesive strip 8b is attached to the head 16, thereby to adhesively bond the plunger 6 to surface 10 or to the object (not shown) arranged between the head 16 and the adhesive strip 8b. When the plunger 6 is rotated such that the head 16 moves away from the surface 10, a tensile force will be exerted on the surface 10 or on the object. When used in this manner (i.e. as a pulling device to generate a tensile force relative to the surface), adhesive strip 8b is needed to attach the plunger 6 to the surface 10 or the object, but it will be recognized that adhesive strips 8a are not needed to secure the device 2 to the surface because the device is maintained in contact with the surface 10 via compression.

Figure 3:
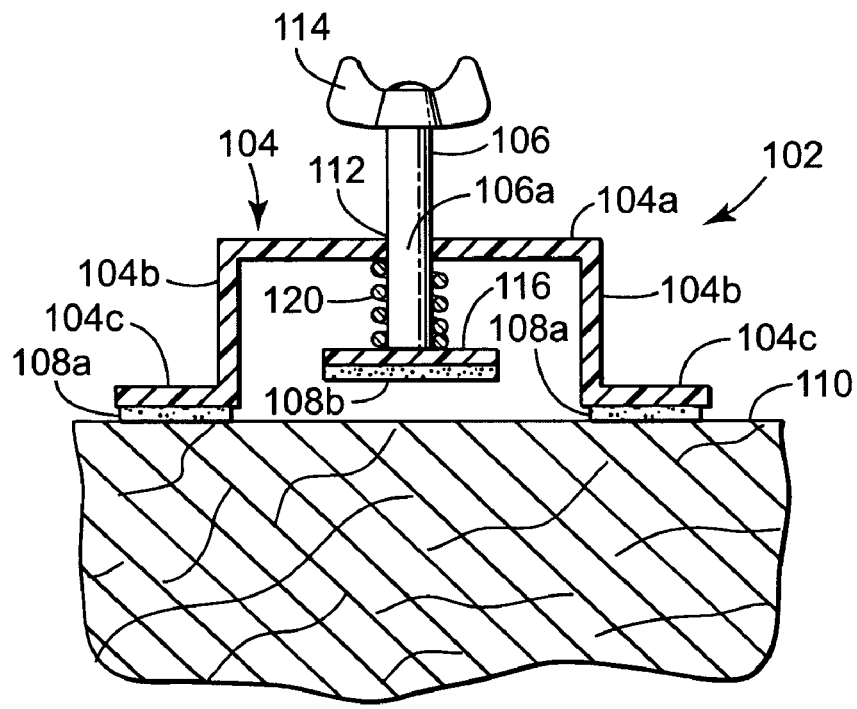
FIG. 3 is a side sectional view of a second embodiment of the invention.

FIG. 3 shows a device 102 in accordance with another embodiment of the invention. The device 102 is similar to the device 2 shown in FIGS. 1 and 2 except the device 102 includes a spring 120 for urging the plunger 106 toward or away from the surface 110, thereby to produce a compressive or tension force on the surface 110, respectively.

The device 102 includes a body member 104, a plunger 106 movably connected with the body member 104, a pair of double-sided stretch releasing adhesive strips 108a attached to the body member 104 to removably adhesively bond the body member 104 to the surface 110, and a double-sided stretch releasing adhesive strip 108b attached to the plunger 106 for adhesively bonding the plunger 106 to surface 110 or an object (not shown) arranged between the plunger 106 and the surface 110.

The body member 104 includes a bridge portion 104a containing an opening 112 for slidably receiving the plunger 106, a pair of parallel leg portions 104b extending perpendicularly in the same direction from opposite sides of the bridge portion 104a, and a pair of feet portions 104c extending outwardly in opposite directions from the ends of the leg portions 104b. The adhesive strips 108a are affixed to the bottom surfaces of the feet portions 104c to adhesively bond the body member 104 to surface 110, and thereby securely bond the device 102 to the surface 110.

Plunger 106 is arranged generally perpendicular to the bridge portion 104a and includes a cylindrical body portion 106a slidably engaging the opening 112 in the body member 104, a handle 114 arranged at one end of the body portion 106a to facilitate manual actuation of the plunger 106, and a head 116 arranged at the end of the body portion 106a opposite the handle 114. The handle 114 is arranged above the bridge portion 104a of the body member 104 to allow a user to readily access the handle 114, and thereby manually actuate the plunger 106.

Spring 120 is arranged between the bridge portion 104a of the device 102 and the head 116. When the plunger 106 is manually urged upwardly away from the surface 110, the spring 120 is compressed and biases the head 116 in the direction of the surface 110. It will be recognized that when the device is used in this manner (i.e. as a clamp to generate a compressive force), adhesive strips 108a are needed to maintain the device 102 in engagement with surface 110, but that adhesive strip 108b is not needed because the plunger 106 is maintained in contact with surface 110 via compression. Stated another way, when the device 102 is used as a clamp, the plunger 106 is forced against the surface 110 via spring 120 which, in turn, forces the body member 104 away from the surface 110, and the adhesive strips 108a serve to hold the body member 104 in contact with the surface 110 to allow the plunger 106 to exert a compressive force on the surface. To remove the device 102 from the surface 110, each adhesive strip 108a is stretched in the known manner to debond the adhesive strip from the device and surface simultaneously.

Alternatively, the spring 120 can be a tension spring that is attached to the bridge portion 104a and the head 116, such that when the spring is urged downwardly in the direction of the surface 110, the spring is put in tension. In this manner, when the head 116 is attached to the surface 110 via adhesive strip 108b, a tensile force is produced on the surface 110. When used in this manner (i.e. as a pulling device to generate a tensile force relative to the surface), adhesive strip 108b is needed to attach the plunger 106 to the surface 110 or the object, but it will be recognized that adhesive strips 108a are not needed to secure the device 102 to the surface because the device is maintained in contact with the surface 110 via compression.

As with the device 2 of FIGS. 1 and 2, head 116 is preferably connected with the plunger 106 with a slip fit type of connection to allow the body portion 106a and the head 116 to move independently.

Figure 4:
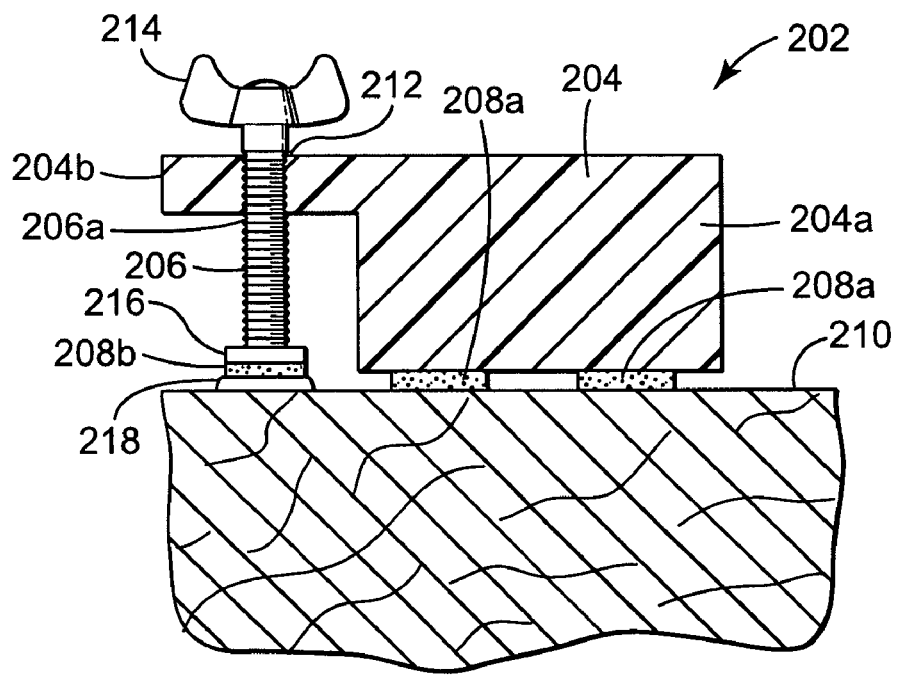
FIG. 4 is a side sectional view of a third embodiment of the invention.

FIG. 4 shows a device 202 in accordance with an alternate embodiment of the invention including a body member 204, a plunger member 206 rotatably attached to the body member 204, a pair of double-sided stretch releasing adhesive strips 208a attached to the body member 204 to removably adhesively bond the body member 204 to a surface 210, and a double-sided stretch releasing adhesive strip 208b attached to the plunger member 206 for adhesively bonding the plunger member 206 to surface 210 or an object 218 arranged between the plunger member 206 and the surface 210. The device of FIG. 4 is particularly suited for generating a tensile or compressive force in a tight location such as a corner, where the devices shown in FIGS. 1–3 would not fit.

The body member 204 includes a main body portion 204a and a cantilever portion 204b containing a threaded opening 212 for receiving the plunger member 206. The cantilever portion 204b extends laterally outwardly from the main body portion 204a. Adhesive strips 208a are affixed to the bottom of the main body portion 204a to adhesively bond the body member 204 to the surface 210, and thereby secure the device 202 to the surface 210.

Plunger 206 is arranged generally perpendicular to the cantilever portion 204b and includes a cylindrical threaded body portion 206a rotatably engaging the opening 212 in the body member 204, a handle 214 arranged at one end of the body portion 206a to facilitate manual rotation of the plunger 206, and a head 216 arranged at the opposite end of the body portion 206a. The handle 214 is arranged above the cantilever portion 204b of the body member 204 to allow a user to readily access the handle 214, and thereby manually adjust the plunger 206. The head 216 is arranged below the cantilever portion 204b and may be rotatably urged either in the direction of the surface 210 to apply a force to the surface, or urged away from the surface 210 to generate a tensile force relative to the surface by rotating the plunger 206 via handle 214.

Device 202 is used to apply a force to object 218 in the same manner as the device of FIGS. 1 and 2, that is, the plunger 206 is rotated such that the head 216 moves in the direction of the surface 210. As the plunger 206 moves toward and engages the object 218, a compressive force will be exerted on object 218. And to use the device 202 to impart a pulling or stretching force on object 218, stretch releasing adhesive strip 208b is attached to the head 216, thereby adhesively bonding the plunger 206 to the object 218. In this manner, when the plunger 206 is rotated such that the head 216 moves away from the surface 210, a tensile force will be exerted on the object 218.

Because of its cantilevered design, the device 202 of FIG. 4 is less stable than the device 2 of FIGS. 1 and 2. Consequently, when the device 202 of FIG. 4 is used as either a clamping device to generate a compressive or as a pulling device to generate a tensile force, it is desirable to include stretch releasing adhesive strips 208a to firmly bond and thereby secure the body member 204 to the support surface 210. As with the device 2 of FIGS. 1 and 2, when the device 202 is used to generate a tensile force, adhesive strip 208b is required, but when the device is used as a clamp, adhesive strip 208b may be omitted.

The device, including both the body member and the plunger, may be formed of a variety of materials depending on the particular intended end use application of the device. Suitable materials include metals such as steel, synthetic plastic materials such as polycarbonate and polyvinyl chloride, and wood. The particular material selected is not significant to the invention hereof, so long as it provides the desired combination of properties such as adequate strength, low cost, and ease of manufacture.

It will be apparent to those of ordinary skill in the art that various changes and modifications may be made without deviating from the inventive concept set forth above. For example, it will be recognized that the size and shape of the device may be modified to adapt the device for certain specific end use applications, that the body member and plunger may be movably attached by means other than a threaded connection, that the number and size of the adhesive strips may be varied, that the plunger may be provided with a pointed tip, drill bit, or other implement depending on the specific end use application intended for the device, and that the location of the cantilever portion 204b may be moved. Thus, the scope of the present invention should not be limited to the structures described in this application, but only by the structures described by the language of the claims and the equivalents of those structures.

What is claimed is:

1. A device for applying a tensile or compressive force to an object or surface, comprising:
 (a) a body;
 (b) a plunger movably connected with said body; and
 (c) a double-sided stretch releasing adhesive attached to said body and attached to said plunger, wherein the double-sided stretch releasing adhesive is arranged between the object or surface and said body and said plunger.

2. A device as defined in claim 1, wherein said body includes a connecting portion containing a through bore, a pair of legs extending in the same direction from opposite sides of said connecting portion, and a pair of feet portions arranged at the end of each leg.

3. A device as defined in claim 2, wherein each foot portion is provided with a stretch releasing adhesive for attaching said body to a surface.

4. A device as defined in claim 1, wherein the plunger is slidably connected with the body member, and further wherein the device includes a force generating member arranged to bias the plunger in the direction of the surface.

5. A device as defined in claim 4, wherein the force generating member is a spring.

6. A device as defined in claim 1, wherein said body includes a main body portion and a cantilever portion extending laterally outwardly from the main body portion, wherein said plunger is movably connected with said cantilever portion.

7. A device as defined in claim 1, wherein said plunger includes a head adapted to receive stretch releasing adhesive.

8. A device as defined in claim 5, wherein said plunger includes a handle.

\* \* \* \* \*